(12) United States Patent
Ishida et al.

(10) Patent No.: US 8,482,902 B2
(45) Date of Patent: Jul. 9, 2013

(54) SOLID ELECTROLYTIC CAPACITOR ELEMENT AND MANUFACTURING METHOD THEREFOR

(75) Inventors: Kouhei Ishida, Nagaokakyo (JP); Yoshihiro Saida, Nagaokakyo (JP); Masaaki Nishioka, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 266 days.

(21) Appl. No.: 12/970,058

(22) Filed: Dec. 16, 2010

(65) Prior Publication Data

US 2011/0157776 A1    Jun. 30, 2011

(30) Foreign Application Priority Data

Dec. 28, 2009  (JP) .................................. 2009-296761
Apr. 28, 2010  (JP) .................................. 2010-103350

(51) Int. Cl.
*H01G 9/00* (2006.01)
*H01G 5/013* (2006.01)

(52) U.S. Cl.
USPC ............ 361/523; 361/524; 361/528; 361/532

(58) Field of Classification Search
USPC ................... 361/523, 524, 528, 529, 532, 534
See application file for complete search history.

(56) References Cited

U.S. PATENT DOCUMENTS

| 7,400,492 B2 | 7/2008 | Baba et al. | |
| 2007/0247781 A1 | 10/2007 | Baba et al. | |
| 2008/0049381 A1* | 2/2008 | Saida et al. | 361/523 |
| 2010/0284128 A1* | 11/2010 | Kabe | 361/523 |

FOREIGN PATENT DOCUMENTS

| EP | 0 768 686 A2 | | 4/1997 |
| JP | 07094369 A | | 4/1995 |
| JP | 2002-025863 A | | 1/2002 |
| JP | 2007-294495 A | | 11/2007 |
| WO | WO2007013456 | * | 2/2007 |

* cited by examiner

*Primary Examiner* — Jayprakash N Gandhi
*Assistant Examiner* — Dion Ferguson
(74) *Attorney, Agent, or Firm* — Dickstein Shapiro LLP

(57) ABSTRACT

A solid electrolytic capacitor containing a solid electrolytic capacitor element with increased heat resistance, resistance to leakage current, and a low ESR and high reliability, includes a solid electrolytic capacitor element having a dielectric layer, a solid electrolyte layer, a carbon paste layer, and a conductive paste layer sequentially stacked on a surface of a valve acting metal plate, where the carbon paste layer has an end thereof on the solid electrolyte layer, the end of the carbon paste layer is covered with an insulating resin layer, and the largest thickness of the capacitor element in the section of the insulating resin layer is not more than the largest thickness of the capacitor element in the section of the conductive paste layer. A manufacturing method is also described.

20 Claims, 3 Drawing Sheets

SOLID ELECTROLYTIC CAPACITOR ELEMENT AND MANUFACTURING METHOD THEREFOR

BACKGROUND OF THE INVENTION

1. Field of the Invention

The present invention relates to a solid electrolytic capacitor element including a dielectric layer, a solid electrolyte layer, a carbon paste layer, and a conductive paste layer sequentially stacked on a surface of a valve acting metal substrate, which has a superior reflow resistance property, a manufacturing method therefor, and a solid electrolytic capacitor using the element.

2. Description of the Related Art

In recent years, electronic devices have been reduced in size, and adapted to digitization for saving electric power and higher frequencies, and the demand for solid electrolytic capacitors with low impedance at high frequencies, with high reliability, and with a high capacitance, has been increasing. As the capacitors having these performance qualities, capacitors have been commercialized which have a sintered tantalum body or aluminum foil as an anode and a highly conductive polymer solid electrolyte as a cathode. Also, in recent years, lead-free solder has been used to increase the temperature for surface mounting onto electronic circuit substrates. For this reason, there has been a need to employ a high heat-resistance material and a structure devised for relaxing thermal stress. The solid electrolyte cathode material has a low resistance, but exhibits poor performance when repairing the dielectric film. Thus, it is often the case that the dielectric film undergoes micro-destruction due to thermal stress at high temperature, thereby making it difficult to prevent an increase in the leakage current.

As examples of use of an insulating resin formed on a solid electrolytic capacitor element, Japanese Patent Application Laid-Open No. 07-094369 (Patent Document 1) discloses a solid electrolytic capacitor in which a solid electrolyte layer is formed on one surface of a valve acting metal divided by an insulator (masking) band, a separate insulator layer formed on a boundary section between the insulator (masking) band and the solid electrolyte layer, and a cathode leading conductor layer formed on the solid electrolyte layer so as to cover a portion of the separate insulator layer or so as not to come into contact with the separate insulator layer. This solid electrolytic capacitor is intended to prevent the material constituting the cathode leading from the conductor layer from penetrating into the discontinuity of the boundary between the solid electrolyte layer and the insulator (masking) band and come into direct contact with the anode oxide film to serve as a dielectric, thereby preventing an increase in leakage current. However, it is the initial characteristics before reflow that are improved by this method. In addition, this method forms an insulating resin on the solid electrolyte layer, and forms a graphite layer, thus reducing the current-carrying area covered with a highly conductive silver paint layer. Therefore, this method has a disadvantage in reducing the equivalent series resistance.

In addition, Japanese Patent Application Laid-Open No. 2007-294495 (Patent Document 2) discloses a stack-type solid electrolytic capacitor with a capacitor element which has an anode body including an anode section and a cathode section with a dielectric oxide film and a cathode layer sequentially formed on a surface of the anode body, in which an insulating resin layer is placed at and in the vicinity of the boundary between the cathode section and the anode section. This solid electrolytic capacitor construction is intended to relax the tension stress and bending stress at or in the vicinity of the boundary between the anode section and the cathode section during resistance welding of the anode section, due to the difference in thickness between the anode section and the cathode section. However, the insulating resin is also formed on a silver paint layer in this technique, thereby resulting in an increase in element thickness. This increase limits the number of elements which can be stacked in a standardized capacitor size.

Japanese Patent Application Laid-Open No. 2002-025863 (Patent Document 3) discloses a capacitor which has a low impedance and shows no increase in leakage current even when the capacitor is subjected to thermal stress or mechanical stress caused by reflow soldering or the like, by disposing a silver paste layer in an area of a carbon paste layer forming a cathode section and providing a gap between an end face of the silver paste layer and an end on a cathode side of an insulating layer serving as a boundary between an anode section and the cathode section. However, Patent Document 3 does not refer to the problem of the increase in temperature in the case of surface mounting to electronic circuit substrates through the use of lead-free solder.

SUMMARY OF THE INVENTION

An object of the present invention is to provide a solid electrolytic capacitor which has a solid electrolytic capacitor element with increased heat resistance, prevents an increase in leakage current caused by the heat generated in a reflow process even in the case of using a lead-free solder with a high melting point, and has a low ESR and high reliability.

As a result of earnest considerations in view of the problems described above, it has been found that defects can be prevented from being caused by a leakage current produced in a reflow process involving lead-free solder, by providing a solid electrolytic capacitor element including a dielectric layer, a solid electrolyte layer, a carbon paste layer, and a conductive paste layer sequentially stacked on a surface of a valve acting metal substrate, in which the carbon paste layer has an end on the solid electrolyte layer, that end of the carbon paste layer is covered with an insulating resin layer covering from the solid electrolyte layer to the carbon paste layer, and the largest thickness T1 of the capacitor element in the section of the insulating resin layer is not more than the largest thickness T2 of the capacitor element in the section of the conductive paste layer, as shown in FIG. 2 for a cross section of the capacitor element, and the present invention has been thus achieved.

That is, the present invention provides the following capacitor element, a manufacturing method therefor, and a capacitor.

[1] A solid electrolytic capacitor element including a dielectric layer, a solid electrolyte layer, a carbon paste layer, and a conductive paste layer sequentially stacked on a surface of a valve acting metal plate, wherein the carbon paste layer has an end thereof on the solid electrolyte layer, the end of the carbon paste layer is covered with an insulating resin layer, and the largest thickness of the capacitor element in the section of the insulating resin layer is not more than the largest thickness of the capacitor element in the section of the conductive paste layer.

[2] The solid electrolytic capacitor element according to item [1], wherein the insulating resin layer on the carbon paste layer reaches an end of the conductive paste layer.

[3] The solid electrolytic capacitor element according to item [1] or [2], wherein the insulating resin layer has a thickness of 5 to 30 µm.

[4] The solid electrolytic capacitor element according to any one of items [1] to [3], wherein the resin forming the insulating resin layer is at least one resin selected from polyphenylsulphone, polyethersulphone, a cyanate ester resin, a fluorine resin, a polyimide, and derivatives thereof.

[5] The solid electrolytic capacitor element according to item [4], wherein the resin forming the insulating resin layer is a polyimide.

[6] A method for manufacturing a solid electrolytic capacitor element including a dielectric layer, a solid electrolyte layer, a carbon paste layer, and a conductive paste layer sequentially stacked on a surface of a valve acting metal plate, wherein the carbon paste layer is formed on the solid electrolyte layer with a portion thereof on an anode body side, thereby forming an end of the carbon paste layer on the solid electrolyte layer, the conductive paste layer is formed so as not to cover the end of the carbon paste layer, and an insulating resin layer is formed in such a way that the end of the carbon paste layer is covered and the largest thickness of the capacitor element in the section of the insulating resin layer is not more than the largest thickness of the capacitor element in the section of the conductive paste layer.

[7] The method for manufacturing a solid electrolytic capacitor element according to item [6], wherein the formation of the insulating resin layer is carried out by application of an insulating resin.

[8] The method for manufacturing a solid electrolytic capacitor element according to item [7], wherein the application is either spray coating, coating through a dispenser, screen printing, or transfer.

[9] A solid electrolytic capacitor, wherein an anode section and a cathode section of the solid electrolytic capacitor element according to any one of items [1] to [5] are respectively connected to an anode lead terminal and a cathode lead terminal, and the entire solid electrolytic capacitor element is sealed with an insulating resin.

The solid electrolytic capacitor element according to the present invention can provide a solid electrolytic capacitor which has superior heat resistance, prevents an increase in leakage current caused by heat generated in a reflow process even using lead-free solder with a high melting point, has a low ESR, and has high reliability.

DETAILED DESCRIPTION OF THE INVENTION

Figure 1:
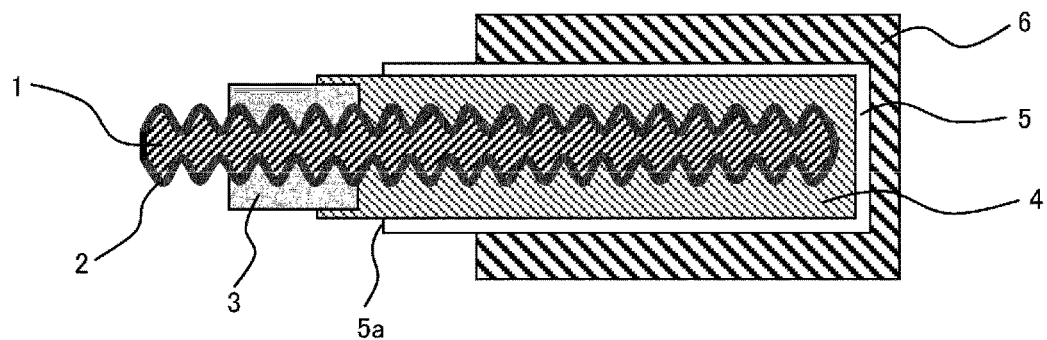
FIG. 1 is a cross-sectional view of a capacitor element according to Example 1 before the formation of an insulating resin layer.

The present invention will be described below in detail.

Capacitor Element

The capacitor element according to the present invention is a capacitor element which has a dielectric layer (2), a solid electrolyte layer (4), a carbon paste layer (5), and a conductive paste layer (6) sequentially stacked on a surface of a valve acting metal substrate (1).

Valve Acting Metal Plate

Valve acting metals for the valve acting metal plate (1) which can be used for the capacitor element according to the present invention include, for example, a single element metal selected from aluminum, tantalum, niobium, titanium, and the like, or alloys thereof. The valve acting metals may have any shape of plate, foil, and the like. While the thickness varies depending on the intended use in the case of metal foil, metal foil with a thickness on the order of 70 to 250 μm is typically used. In addition, while the size and shape also vary depending on the intended use, a rectangular metal piece with a width on the order of 0.5 to 10 mm and a length on the order of 1 to 15 mm is preferable as a plate-shaped element unit, more preferably with a width on the order of 1 to 5 mm and a length on the order of 2 to 10 mm.

The valve acting metal plate (1) preferably has pores, and a surface thereof is subjected in advance to, for example, an etching process or the like through a known method or the like to roughen.

It is also possible to use, as the valve acting metal plate (1), a product obtained by laminating a plurality of metal plates with each other and integrally joining the adjacent metal plates by partial welding or the like thereof.

Dielectric Layer

While in general, the valve acting metal has a surface oxidized with oxygen in the air as a dielectric oxide film, the valve acting metal plate (1) for use in the present invention is preferably subjected to a treatment for forming the dielectric layer (2). This treatment is not particularly limited, and examples thereof include a method of carrying out a chemical conversion treatment under the conditions of a temperature of 0 to 80° C., a current density of 0.1 to 200 mA/cm$^2$, a voltage of a value corresponding to the withstand voltage obtained for the treatment, and a chemical conversion time within 60 minutes, with the use of an aqueous solution containing at least one of oxalic acid, adipic acid, boric acid, phosphoric acid, and the like, on the order of 0.05 to 20 mass % as an electrolyte solution.

Masking Layer

For the capacitor element according to the present invention, in order to make it easier to electrically isolate an anode section (a section connected to an anode terminal of the capacitor) and a cathode section (a section of the solid electrolyte layer formed on the dielectric layer) of the valve acting metal plate from each other, it is preferable to provide a masking layer (3) on the dielectric layer between the anode section and the cathode section.

The masking layer (3) can be formed by, for example, applying an insulating material or attaching an insulating tape to the dielectric layer formed on the surface to provide the insulating material between the anode section and cathode section of the valve acting metal plate.

Examples of the insulating material include insulating resins (for example, the same resin as the material for use in an insulating resin layer described later can be used), and compositions composed of an inorganic fine powder and a cellulosic resin (Japanese Patent Application Laid-Open No. 11-80596). More specific examples of the insulating material include polyphenylsulphone, polyethersulphone, cyanate ester resins, fluorine resins (tetrafluoroethylene, a tetrafluoroethylene-perfluoroalkyl vinyl ether copolymer, and the like), low molecular weight polyimides and derivatives thereof, and compositions composed of a soluble polyimide siloxane and an epoxy resin (Japanese Patent Application Laid-Open No. 8-253677). In addition, the method for providing the insulating layer is not particularly limited, and may be any method as long as the method is capable of forming an insulating layer with a predetermined width on the substrate.

Solid Electrolyte Layer

The solid electrolyte layer (4) may be any conductive organic substance (for example, a conductive polymer) or conductive inorganic oxide.

Alternatively, multiple materials may be formed sequentially, or a composite material may be formed. Preferably, known conductive polymers can be used, for example, having a pyrrole, thiophene, furan, or aniline structure, or a conductive polymer including at least one substituted derivatives of these polymers as a repeating unit. For example, methods (Japanese Patent Application Laid-Open Nos. 2-15611 and 10-32145) can be used in which a 3,4-ethylenedioxythiophene monomer and an oxidizer, preferably in the form of a solution, are applied onto the dielectric film of the metal foil sequentially or separately, or simultaneously to form the solid electrolyte layer.

Typically, a dopant is used in the conductive polymer. The dopant may be any compound as long as the compound has a doping ability, and for example, organic sulphonic acids, inorganic sulphonic acids, organic carboxylic acids, and salts thereof can be used. Typically, an aryl sulphonate-based dopant is used. For example, salts of a benzene sulphonic acid, a toluene sulphonic acid, a naphthalene sulphonic acid, an anthracene sulphonic acid, an anthraquinone sulphonic acid, or substituted derivatives thereof can be used. In addition, as a compound which can elicit particularly superior capacitor performance, compounds having one or more sulphonic acid groups and a quinine structure in their molecules, heterocyclic sulphonic acids, anthracene monosulphonic acids, and salts thereof may be used. These dopants may be used singly, or may be used in combination. While the conductive layer is typically formed by applying a paste containing a carbon paste and a conductive metal powder, the conductive layer may be formed through other methods.

Carbon Paste Layer

The carbon paste layer (5) can be formed by applying a carbon paste. In this case, the carbon paste layer (5) is formed on the solid electrolyte layer (4) with a portion thereof on the anode body side, more specifically, so as not to cover the entire solid electrolyte layer (4). This formation produces an end (5a) of the carbon paste layer on the solid electrolyte layer (4).

The carbon paste applied is not particularly limited, and it is possible to use known carbon pastes for the carbon paste. As the carbon in the carbon paste for use in the present invention, specifically, carbon black, natural graphite, artificial graphite, and the like can be used.

Conductive Paste Layer

The conductive paste layer (6) is a layer of a different material from the carbon paste layer (5), and a conductive material (for example, a silver paste) with higher conductivity than that of the carbon paste layer (5) is typically used for the conductive paste layer (6).

The conductive paste layer can be formed by applying a conductive paste. In this case, the conductive paste layer (6) is formed so as not to cover the end (5a) of the carbon paste layer (5).

Examples of the conductive paste preferably include metal pastes, for example, a thermosetting or thermoplastic resin composition containing a metal powder, a binder resin, and a solvent. Examples of the metal powder include powders of gold, silver, copper, and platinum, and above all, chemically stable and economical silver powder is most preferable. In addition, a composition is preferable which contains the metal powder at 30 mass % or more with respect to the total filling material.

It is to be noted that examples of the method for applying the carbon paste and the conductive paste include dip coating, spray coating, coating through a dispenser, and screen printing. Above all, the method through dip coating is preferable in view of economy.

Insulating Resin Layer

For the capacitor element according to the present invention, the end (5a) of the carbon paste layer is coated with an insulating resin layer.

Figure 3:
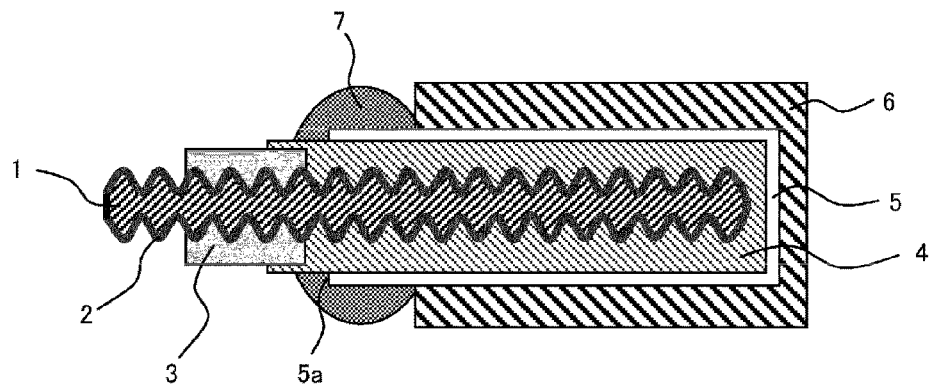
FIG. 3 is a cross-sectional view of a capacitor element according to Example 2.

The insulating resin layer (7) may be provided to further reach a masking layer (not shown) and/or reach the end of the conductive paste layer (FIG. 3). The insulating resin layer (7) provided to reach the end of the conductive paste layer is preferable, because the defectives decrease, in particular, the percentage of defectives in reflow.

In addition, the capacitor element typically has a largest thickness in the section of the conductive paste layer. Therefore, in order to keep the total thickness of the element from being increasing, it is important that the largest thickness T1 of the capacitor element in the section of the insulating resin layer be set not more than the largest thickness T2 of the capacitor element in the section of the conductive paste layer. In view of ease of formation, the insulating resin layer (7) itself preferably has a thickness of 1 μm or more, and more preferably on the order of 5 to 30 μm, within the range of not more than the upper limit of the element thickness.

As the material constituting the insulating resin layer (7), common heat resistant resins, preferably a heat resistant resin or a precursor thereof which is soluble or swellable in a solvent, a composition composed of an inorganic fine powder and a cellulosic resin, and the like can be used. Specific examples of the material include polyphenylsulphone, polyethersulphone, cyanate ester resins, fluorine resins (tetrafluoroethylene, a tetrafluoroethylene-perfluoroalkyl vinyl ether copolymer, and the like), and polyimides and derivatives thereof. Among these, the polyimides, polyethersulphone, and fluorine resins and precursors thereof are preferable, and in particular, the polyamides are preferable, and have sufficient adhesion to and sufficiently fill the valve acting metal, and are superior in terms of insulating properties to exhibit resistance to high-temperature treatments up to about 450° C.

Polyimides can be preferably used which are able to be sufficiently cured by a heat treatment at a low temperature of 200° C. or less, preferably 100 to 200° C., and less subject to external impacts such as breakages or destructions due to heat from the dielectric layer on the surface of the anode foil.

As specific examples, soluble polyimides are preferably used, such as a solution of a low molecular polyimide applied and then cured by a heat treatment, dissolved in a less hygroscopic solvent such as 2-methoxyethyl ether or triethylene glycol dimethyl ether (for example, available as "UPICOAT (registered tradename) FS-100L" from Ube Industries, Ltd.), or a solution of a polyimide resin dissolved in NMP (N-methyl-2-pyrrolidone) or DMAc (dimethylacetamide) (for example, available as "RIKACOAT (registered tradename)" from New Japan Chemical Co., Ltd.).

These polyimides may be used to easily prepare a solution or a dispersion of any solid content concentration suitable for the application operation. Typically, the solution or dispersion preferably has a concentration of about 5 to 60 mass %, more preferably about 10 to 40 mass %. The polyimides are likely to blur at lower concentrations or lower viscosities, whereas the polyimides look stringy at higher concentrations or higher viscosities, resulting in a tendency to become unstable in terms of width or thickness. Thus, the concentration may be adjusted using of these phenomena as indicators. The application method is also not particularly limited, and it is possible to use a variety of techniques such as spray coating, coating through a dispenser, screen printing, and a transfer method.

Solid Electrolytic Capacitor

The solid electrolytic capacitor according to the present invention is obtained by connecting an anode lead terminal to the anode section of the capacitor element and connecting a cathode lead terminal to the cathode section thereof, and sealing the entire element with an insulating resin such as an epoxy resin. The capacitor element may be stacked and used as such. For example, a stack-type solid electrolytic capacitor can be obtained by stacking the capacitor element on a lead terminal.

EXAMPLES

While the present invention will be described below in detail with reference to examples and comparative examples, the scope of the present invention is not to be considered limited to these examples and comparative examples in any way.

Example 1

One shorter side section of chemical foil of etched aluminum cut to a size of 3 mm×10 mm was fixed to a metallic guide by welding. The other shorter side which was not subjected to welding serves as a shorter side on the cathode section side. A polyimide solution with a concentration of 15 mass % ("RIKACOAT (registered tradename)" from New Japan Chemical Co., Ltd.) was applied in a linear shape with a width of about 1 mm parallel to the shorter side on the cathode section side in a position of 4 to 5 mm from the shorter side on both surfaces of the 3 mm×10 mm foil, and dried at 160° C. for 1 hour to form a masking layer (3) for separating the anode section and the cathode section from each other. It is to be noted that this masking layer provides the welded shorter side to serve as the anode section and the other side to serve as the cathode section.

The chemical foil of etched aluminum on the cathode section side was subjected to a chemical conversion treatment with a voltage of 13 V applied in an aqueous solution of 10 mass % ammonium adipate to form a dielectric oxide film, and then washed with water and dried.

Next, the foil with the masking layer (3) and the dielectric oxide film was sequentially immersed in an aqueous oxidant solution prepared to contain 20 mass % of ammonium persulfate and 0.1 mass % of 2-sodium naphthalene sulfonate, and then in a 2-propanol solution of 1.2 mol/L of 3,4-ethylenedioxythiophene (Clevios (registered tradename) from H.C. Starck). These steps of immersion were applied to the portion from the shorter side on the cathode section side to 0.2 mm of the previously formed masking layer (3). Next, the foil was left at 40° C. for 10 minutes to complete oxidative polymerization. Furthermore, after repeating the process from the immersion into the aqueous oxidant solution to this polymerization reaction 25 times, the substrate was washed with water of 25° C. to form the solid electrolyte layer (4) composed of a conductive polymer.

Then, the portion covered with the solid electrolyte layer was immersed in a carbon paste immersion tank. The portion was immersed up to the end of the masking layer on the cathode side, extracted and air-dried, and then heated at 120° C. to form the carbon paste layer (5). Furthermore, the portion covered with the carbon paste layer (5) was immersed in a silver paste tank to a position 1 mm from the end of the masking layer on the cathode side, extracted and air-dried, and then dried at 150° C. for 1 hour to form the silver paste layer (6), thereby manufacturing a capacitor element.

Figure 2:
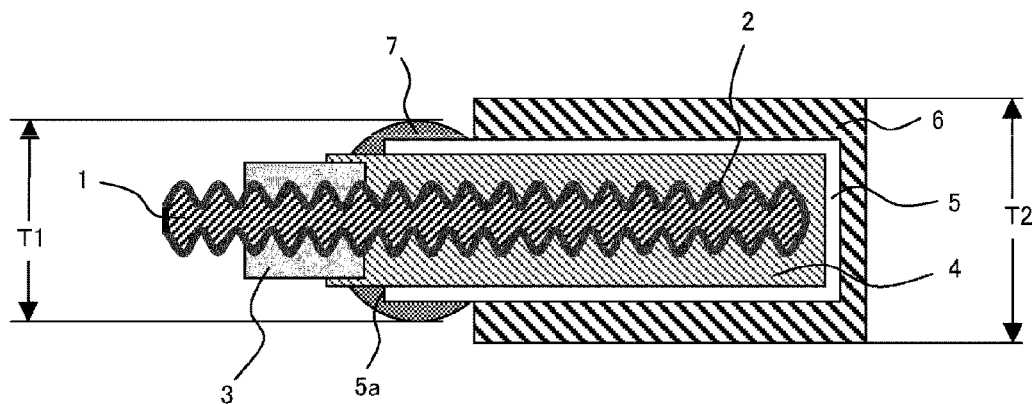
FIG. 2 is a cross-sectional view of the capacitor element according to Example 1 after the formation of the insulating resin layer.

As a result, the capacitor element was obtained with a cross-section structure as shown in FIG. 1. A polyimide solution with a concentration of 15 mass % ("RIKACOAT (registered tradename)" from New Japan Chemical Co., Ltd.) was applied by a dispenser (from Musashi Engineering, Inc.) in a linear shape with a line width of 1 mm to a portion of this capacitor element from the carbon paste layer to the solid electrolyte layer. After that, drying at 180° C. for 1 hour was carried out to form the insulating resin layer (7). The cross-section structure in this stage is shown in FIG. 2. The maximum film thickness of this insulating resin layer was about 15 µm (the film thickness of only a portion of the insulating resin layer exposed at the surface, except for a portion thereof permeating the solid electrolyte layer and the carbon paste layer; the same applies to the following). It is to be noted that in this case, the average thickness of the carbon paste layer was about 3 µm, and the average thickness of the silver paste layer was about 30 µm. In addition, while the silver paste layer is almost flat, with the maximum thickness thereof slightly greater than 30 µm. Therefore, the maximum thickness of the capacitor element in the section of the insulating resin layer is not more than the maximum thickness of the capacitor element in the section of the conductive paste layer.

On a lead frame (made of a copper alloy), 5 sheets of this element were stacked and joined with a silver paste, and the whole of the stacked elements was then sealed with an epoxy resin to manufacture a stack-type solid electrolytic capacitor of 4.3 mm in width, 7.4 mm in length, and 1.9 mm in height. Aging was carried out with a rated voltage applied at 110° C. for 1 hour, thereby providing 10,000 pieces in total of solid electrolytic capacitors. These capacitors were measured for the capacitance and loss coefficient (tan δ×100%) at 120 Hz as initial characteristics, the equivalent series resistance (ESR) at 100 kHz as an indicator of the impedance indicating the resistance of a capacitor to the alternating current, and the leakage current (LC). Table 1 shows the percentage of non-defective products for the initial characteristics (%) and the overall average value for ESR for all of the capacitors. In addition, a reflow test was carried out by passing all of 10,000 pieces of these non-defective products through a reflow furnace at a peak temperature of 270° C. for 10 seconds three times. Thereafter, the leakage current value was measured to calculate the incidence of short circuits after the reflow (Table 1). It is to be noted that with respect to the leakage current (LC), the current value 1 minute after the application of the rated voltage was obtained, and regarded as short circuit if it was 300 pA or more. In addition, 5,000 pieces of the capacitors after the reflow were observed under a microscope at 50-fold magnification to obtain the number of defective products with found a cracked surface.

Example 2

Solid electrolytic capacitor elements were manufactured and evaluated in the same way as in Example 1, except for the application of a polyimide solution for the formation of the insulating resin layer. For the application of a polyimide solution, a polyimide solution with a concentration of about 40 mass % was applied to the periphery of a rotating disk, and the polyimide solution was transferred to the capacitor element while rotating this disk on the capacitor element, thereby forming an insulating resin layer with a line width of about 1 mm. The cross-section structure of the created capacitor element is shown in FIG. 3, in which the maximum thickness of the insulating resin layer was about 30 μm, while the maximum thickness of the capacitor element in the section of the insulating resin layer was not greater than the maximum thickness of the capacitor element in the section of the conductive paste layer. The results are shown in Table 1.

Example 3

Figure 4:
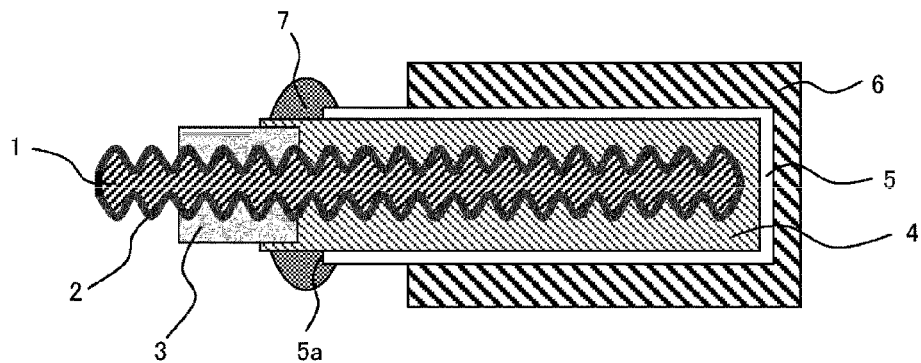
FIG. 4 is a cross-sectional view of a capacitor element according to Example 3.

Solid electrolytic capacitors were manufactured and evaluated in exactly the same way as in Example 2, except that a rotating disk with half the thickness of the rotating disk in Example 2 was used to transfer a soluble polyimide solution in a line width of 0.5 mm. The cross section of the obtained solid electrolytic capacitor is shown in FIG. 4. The insulating resin layer is formed, in terms of position, almost only on the solid electrolyte, and on a portion of the carbon paste, and the maximum thickness of the insulating resin layer was 20 μm. Therefore, the maximum thickness of the capacitor element in the section of the insulating resin layer is not more than the maximum thickness of the capacitor element in the section of the conductive paste layer.

The results are shown in Table 1. While no difference is found in the percentage of non-defective products, the incidence of short circuit after reflow is lower in Example 2. From this result, it is believed that the incidence of short circuits in the high temperature reflow is not caused mainly around the masking layer and the solid electrolyte layer.

Example 4

Figure 5:
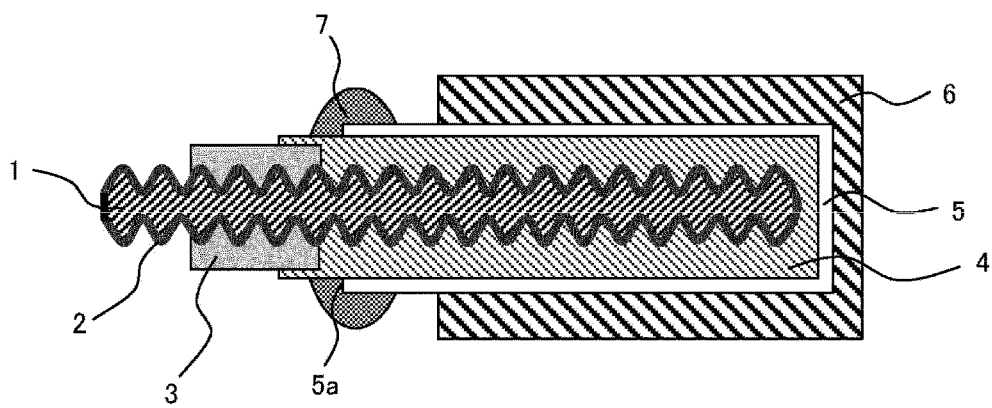
FIG. 5 is a cross-sectional view of a capacitor element according to Example 4.

Solid electrolytic capacitors were manufactured and evaluated in exactly the same way as in Example 3, except that the position of the transferred soluble polyimide solution was shifted. The cross section of the solid electrolytic capacitor obtained in this case is shown in FIG. 5. The insulating resin layer was shifted parallel to a position to cover more of the carbon paste layer, as compared with Example 3 (FIG. 4). The maximum thickness of the insulating resin layer was 20 μm. Therefore, the maximum thickness of the capacitor element in the section of the insulating resin layer is not more than the maximum thickness of the capacitor element in the section of the conductive paste layer.

The results are shown in Table 1. As compared with Example 3, while no difference is found in the percentage of non-defective products, the incidence of short circuits after the reflow is lower. However, the same effect as shown in Example 1 was not observed. It can be said from this result that the more coverage of the carbon paste layer with the insulating resin layer is effective for reducing the percentage of defective products resulting from reflow. Furthermore, it is also preferable to cover the solid electrolyte layer in the same way.

Example 5

Solid electrolytic capacitor elements were manufactured and evaluated in the same way as in Example 1, except that a 10 mass % butyl acetate solution of Viton rubber (a fluorine-containing rubber composed of a vinylidene fluoride-ethylene tetrafluoride-propylene hexafluoride copolymer) was used instead of the soluble polyimide solution. The obtained solid electrolytic capacitor elements have almost the same cross-section structure as in FIG. 2, in which the thickness of the insulating resin layer is 5 μm. Therefore, the maximum thickness of the capacitor element in the section of the insulating resin layer is not more than the maximum thickness of the capacitor element in the section of the conductive paste layer. The results are shown in Table 1.

Example 6

Solid electrolytic capacitor elements were manufactured and evaluated in the same way as in Example 1, except that a 50 mass % isobutyl alcohol solution of a silicon resin was used instead of the soluble polyimide solution in Example 1. The obtained solid electrolytic capacitor elements have almost the same cross-section structure as in FIG. 2. The thickness of the insulating resin layer was 15 μm. Therefore, the maximum thickness of the capacitor element in the section of the insulating resin layer is not more than the maximum thickness of the capacitor element in the section of the conductive paste layer. The results are shown in Table 1.

Comparative Example 1

Figure 6:
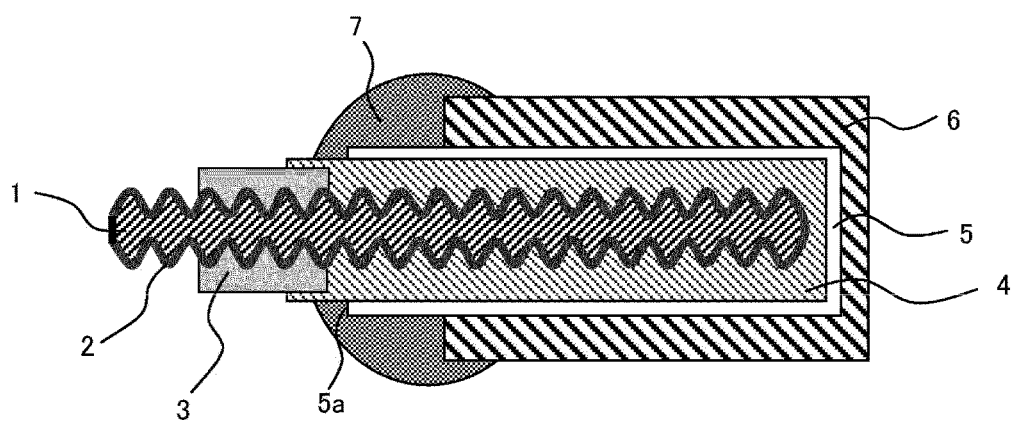
FIG. 6 is a cross-sectional view of a capacitor element according to Comparative Example 1.

In Example 1, the nozzle of the dispenser was changed to expand the range coated with the soluble polyimide solution for manufacturing and evaluating solid electrolytic capacitor elements. The cross section of the obtained solid electrolytic capacitor element is shown in FIG. 6. The polyimide covers the silver paste, and the insulating resin layer on the silver paste had a thickness of about 15 μm. More specifically, the maximum thickness of the capacitor element in the section of the insulating resin layer is greater than the maximum thickness of the capacitor element in the section of the conductive paste layer. The results are shown in Table 1. As compared with Example 1, there is an increased incidence of cracks. It is believed that the increase in the total thickness of the stack made it impossible to ensure the resin thickness of the outer layer, thereby causing the cracks.

Comparative Example 2

In Example 1, the capacitor element with the silver paste layer was used without providing the insulating resin layer to manufacture and evaluate 10,000 pieces of solid electrolytic capacitors as in Example 1. The results are shown in Table 1.

Comparative Example 3

Figure 7:
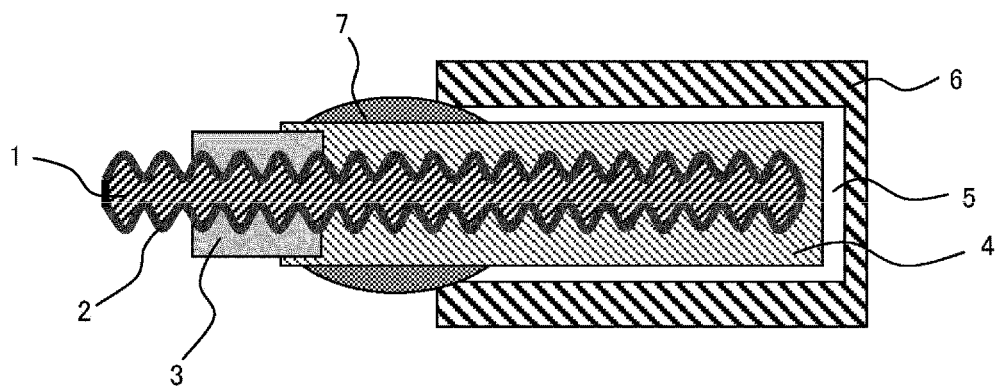
FIG. 7 is a cross-sectional view of a capacitor element according to Comparative Example 3.

Solid electrolytic capacitor elements were manufactured in the same way as in Example 1, except for changing the order of applying the polyimide solution for the formation of the insulating resin layer in Example 1. More specifically, after the formation of the solid electrolyte, the polyimide solution was used for forming a coating, and the carbon paste layer and the silver paste layer were then formed. Except for the order of the application, the procedure is exactly the same as in Example 1. In other words, the end of the carbon paste layer is not covered with the insulating resin layer. FIG. 7 shows a cross section in this case. In addition, the results are shown in Table 1.

TABLE 1

| Example | ESR Average Value (mΩ) | Percentage of Non-Defective Capacitors for Initial Characteristics (%) | Number of Products Short-Circuited after Reflow/Number of Products to be Evaluated | Number of Products with Crack Caused after Reflow/Number of Products to be Evaluated |
|---|---|---|---|---|
| Example 1 | 5.1 | 98 | 1/10000 | 0/5000 |
| Example 2 | 5.3 | 98 | 1/10000 | 0/5000 |
| Example 3 | 5.2 | 98 | 8/10000 | 0/5000 |
| Example 4 | 5.2 | 98 | 4/10000 | 0/5000 |
| Example 5 | 5.1 | 98 | 1/10000 | 0/5000 |
| Example 6 | 5.2 | 98 | 1/10000 | 0/5000 |
| Comparative Example 1 | 6.5 | 98 | 1/10000 | 24/5000 |
| Comparative Example 2 | 5.2 | 98 | 11/10000 | 0/5000 |
| Comparative Example 3 | 8.9 | 86 | 1/10000 | 0/5000 |

What is claimed is:

1. A solid electrolytic capacitor element comprising a dielectric layer, a solid electrolyte layer, a carbon paste layer, and a conductive paste layer sequentially stacked on a surface of a valve acting metal plate, wherein
the carbon paste layer has an end offset from an end of the solid electrolyte layer and said end of the carbon paste layer is covered with an insulating resin layer, and the insulating resin layer does not directly contact with the dielectric layer and the distal ends of a solid electrolyte layer and carbon paste layer are disposed at different positions, and
the greatest thickness of the capacitor element in the part thereof containing the insulating resin layer is not more than the greatest thickness of the capacitor element in the part thereof containing the conductive paste layer.

2. The solid electrolytic capacitor element according to claim 1, wherein the insulating resin layer on the carbon paste layer covers an end of the conductive paste layer.

3. The solid electrolytic capacitor element according to claim 2, wherein the insulating resin layer has a thickness of 5 to 30 μm.

4. The solid electrolytic capacitor element according to claim 3, wherein the insulating resin layer comprises at least one resin selected from the group consisting of polyphenylsulphone, polyethersulphone, cyanate ester, fluorine, polyimide, and derivatives thereof.

5. The solid electrolytic capacitor element according to claim 4, wherein the insulating resin layer comprises a polyimide.

6. The solid electrolytic capacitor element according to claim 3, wherein the valve acting metal plate comprises a metal foil containing pores and having a thickness of 70 to 250 μm, the conductive paste layer has a higher conductivity than the carbon paste layer, and the conductive paste layer contains at least 30 mass% of silver.

7. The solid electrolytic capacitor element according to claim 3, further comprising an anode terminal and a cathode lead terminal, and wherein the entire solid electrolytic capacitor element is sealed with an insulating resin.

8. The solid electrolytic capacitor element according to claim 1, wherein the insulating resin layer has a thickness of 5 to 30 μm.

9. The solid electrolytic capacitor element according to claim 8, wherein the insulating resin layer comprises a polyimide.

10. The solid electrolytic capacitor element according to claim 9, further comprising an anode terminal and a cathode lead terminal, and wherein the entire solid electrolytic capacitor element is sealed with an insulating resin.

11. The solid electrolytic capacitor element according to claim 1, wherein the insulating resin layer comprises at least one resin selected from the group consisting of polyphenylsulphone, polyethersulphone, cyanate ester, fluorine, polyimide, and derivatives thereof.

12. The solid electrolytic capacitor element according to claim 11, further comprising an anode terminal and a cathode lead terminal, and wherein the entire solid electrolytic capacitor element is sealed with an insulating resin.

13. A solid electrolytic capacitor element comprising
a valve acting metal plate having first and second ends,
a dielectric layer surrounding the valve acting metal plate,
a solid electrolyte layer surrounding the dielectric layer while having a first end offset from the metal plate first end,
a carbon paste layer surrounding the solid electrolyte layer while having a first end offset from the solid electrolyte first end,
a conductive paste layer having a first end offset from the carbon paste layer first end, and
an insulating resin layer covering the carbon paste layer first end, and the insulating resin layer does not directly contact with the dielectric layer and the distal ends of a solid electrolyte layer and carbon paste layer are disposed at different positions,
wherein the greatest thickness of the capacitor element in the part thereof containing the insulating resin layer is not more than the greatest thickness of the capacitor element in the part thereof containing the conductive paste layer.

14. The solid electrolytic capacitor element according to claim 13, wherein the insulating resin layer on the carbon paste layer covers an end of the conductive paste layer.

15. The solid electrolytic capacitor element according to claim 14, wherein the insulating resin layer has a thickness of 5 to 30 μm.

16. The solid electrolytic capacitor element according to claim 15, wherein the insulating resin layer comprises at least one resin selected from the group consisting of polyphenylsulphone, polyethersulphone, cyanate ester, fluorine, polyimide, and derivatives thereof.

17. The solid electrolytic capacitor element according to claim 16, wherein the valve acting metal plate comprises a metal foil containing pores and having a thickness of 70 to 250 μm, the conductive paste layer has a higher conductivity than the carbon paste layer, and the conductive paste layer contains at least 30 mass% of silver.

18. A method for manufacturing a solid electrolytic capacitor element comprising sequentially stacking a dielectric layer, a solid electrolyte layer, a carbon paste layer, and a conductive paste layer on a surface of a valve acting metal plate, wherein the carbon paste layer is formed on the solid electrolyte layer with to form an end of the carbon paste layer offset from an end of the solid electrolyte layer, the conductive paste layer is formed so as to have an end which does not cover the end of the carbon paste layer, and forming an insulating resin layer on the carbon paste layer covering the end of the carbon paste layer such that the insulating resin layer does not directly contact with the dielectric layer and the distal ends of a solid electrolyte layer and carbon paste layer are disposed at different positions, and the greatest thickness of the capacitor element in a section containing the insulating resin layer is not more than the greatest thickness of the capacitor element in a section containing the conductive paste layer.

19. The method for manufacturing a solid electrolytic capacitor element according to claim 18, wherein the insulating resin layer is formed by application of an insulating resin.

20. The method for manufacturing a solid electrolytic capacitor element according to claim 19, wherein the insulating resin layer application is formed by spray coating, coating through a dispenser, screen printing, or transfer.

* * * * *